(12) United States Patent
Cloutier et al.

(10) Patent No.: US 7,154,850 B1
(45) Date of Patent: Dec. 26, 2006

(54) WIRELESS DATA TRANSMISSION USING TIME OUT CONTROL

(75) Inventors: Joseph E. Cloutier, Cedar Knolls, NJ (US); Tejaskumar R. Patel, Lake Hiawatha, NJ (US); James C. Stekas, Murray Hill, NJ (US); Tomas S. Yang, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1137 days.

(21) Appl. No.: 09/665,724

(22) Filed: Sep. 20, 2000

(51) Int. Cl.
*H04L 12/26* (2006.01)

(52) U.S. Cl. ........................ 370/230; 445/452

(58) Field of Classification Search ........ 370/229–234, 370/235, 395.52, 412, 252, 338
See application file for complete search history.

(56) References Cited

U.S. PATENT DOCUMENTS

| | | | | |
|---|---|---|---|---|
| 4,769,815 | A * | 9/1988 | Hinch et al. | 370/94 |
| 5,371,734 | A * | 12/1994 | Fischer | 370/18 |
| 5,392,286 | A * | 2/1995 | Tanaka et al. | 370/94.1 |
| 5,550,868 | A * | 8/1996 | Boccuzzi | 375/330 |
| 5,570,346 | A * | 10/1996 | Shur | 370/17 |
| 5,774,479 | A | 6/1998 | Lee et al. | 371/33 |
| 6,038,216 | A * | 3/2000 | Packer | 370/231 |
| 6,185,428 | B1 * | 2/2001 | Kingdon et al. | 455/456 |
| 6,240,463 | B1 * | 5/2001 | Benmohamed et al. | 709/238 |
| 6,269,080 | B1 * | 7/2001 | Kumar | 370/236 |
| 6,330,451 | B1 * | 12/2001 | Sen et al. | 455/452.2 |
| 6,477,150 | B1 * | 11/2002 | Maggenti et al. | 370/312 |
| 6,567,482 | B1 * | 5/2003 | Popovic' | 375/343 |
| 6,697,331 | B1 * | 2/2004 | Riihinen et al. | 370/236 |
| 6,757,245 | B1 * | 6/2004 | Kuusinen et al. | 370/230 |
| 6,791,945 | B1 * | 9/2004 | Levenson et al. | 370/235 |

OTHER PUBLICATIONS

T. Goff et al., "Freeze-TCP : A true end-to-end TCP enhancement mechanism for mobile environments", INFOCOM 2000. 19th Annual Joint Conf. Of the IEEE Computer and Communications Societies. Proceedings, IEEE Tel Aviv, Israel, Mar. 26-30, 2000, Piscataway, NJ USA, pp 1537-1545.

* cited by examiner

*Primary Examiner*—Man U. Phan
*Assistant Examiner*—Toan Nguyen

(57) ABSTRACT

The probability of a time out and the resulting waste of channel capacity in a communication system is decreased by controlling the length of the time out period so as to minimize the number of time outs that occur. The length of the time out is based on the sum of the average channel delay and four times the deviation in the channel delay. A delay is introduced into the communication channel so as to increase the deviation in the channel delay. This results in an increase in the length of time required for a time out. As a result, the number of time outs is drastically decreased which in turn decreases the number of wasteful ramp up times that results in a more efficient use of channel capacity.

12 Claims, 3 Drawing Sheets

WIRELESS DATA TRANSMISSION USING TIME OUT CONTROL

BACKGROUND OF THE INVENTION

1. Field of the Invention

The present invention relates to communications; more specifically, wireless communications.

2. Description of the Related Art

Most wired and wireless data transfers use a common protocol known as TCP/IP (Transmission Control Protocol/Internet Protocol). TCP involves a transmitter sending IP packets of data to a receiver that replies with acknowledgment messages (ACKs) when data is correctly received. Data packets that are lost or corrupted are not acknowledged and are retransmitted until they are received successfully.

In addition to insuring that all transmitted data is correctly received, the ACK scheme also serves to meter the flow of data. When TCP transmissions begin, the initial transmitted data rate is low and ramps up as ACKs are received through a process called "Slow Start". The Slow Start process begins with the transmitter sending one packet of data and waiting for an acknowledge message from the receiver. After receiving the first ACK, the transmitter then sends two packets of data. Each time an ACK is received in response to a transmission, the number of packets transmitted in the next transmission is increased resulting in an exponential increase in data rate illustrated as Ramp 10 in FIG. 1. Eventually a point is reached when, the maximum data rate of the transmission path is attained (point 12 in FIG. 1) and the transmitter sends data at a rate equal to the rate the receiver acknowledges it.

Transmission at the maximum data rate will be persist until an error occurs indicated by failure of the transmitter to receive an acknowledgement of data sent to the receiver. Should this occur the transmitter assumes the data is lost due to network congestion and invokes the Slow Start procedure. This is illustrated in portion 14. It should be noted that the rate at which the data transmissions are ramped up to the maximum transmission rate, is dependent on how quickly acknowledgments arrive at the transmitter and hence on the the round trip delay in the communication channel. For example, each step up in the ramp involves transmitting one or more packets of data and waiting for one or more acknowledgments from a receiver. In a system such as a wired communication system, the round trip delays may be as little as 1 or 2 milliseconds and as a result, the ramp up period is relatively quick. Unfortunately, in wireless communication systems the round trip delay may be on the order of 100 or 200 milliseconds. As a result, the ramp up period in wireless communication systems is relatively long as illustrated by dashed ramp up curve 16. As a result, in wireless communication systems, the slower ramp up time results in a waste of channel capacity illustrated by area 18.

Normally, errors are indicated by repeated acknowledgements with the same sequence number, indicating that the receiver is receiving data but a packet has been lost. To handle cases where many packets are lost, and no acknowledgments are made, TCP also includes a time out period. If an acknowledgment is not received within the time out period the transmitter will assume all unacknowledged packets are lost and begin retransmission and Slow Start. Such timeouts rarely occur in a wired system because the transmission path is reliable and multiple packet losses are very rare. In a wireless system, varying conditions of noise, fading, and channel allocation among multiple users can cause delays in data transmission sufficient to cause TCP timeouts even when no packets are lost. Therefore wireless data are far more vulnerable to time outs than wired systems and their associated slower ramp up of data transmission rates results in a greater reduction of channel capacity per time out.

SUMMARY OF THE INVENTION

The present invention decreases the probability of a time out and the resulting waste of channel capacity in a communication system by operating in a manner that elevates the length of the time out period so as to minimize the number of time outs that occur. In the current version of TCP (dubbed RENO and used by almost all computers on the Internet) the length of the time out is based on the sum of the average channel round trip delay and four times the deviation from the average in the channel round trip delay. A delay is introduced into the communication channel so as to increase the deviation from the average in the channel delay. This results in an increase in the length of time required for a time out. As a result, the number of time outs is drastically decreased which in turn decreases the number of wasteful ramp up times that results in a more efficient use of channel capacity.

DETAILED DESCRIPTION OF THE INVENTION

Figure 1:
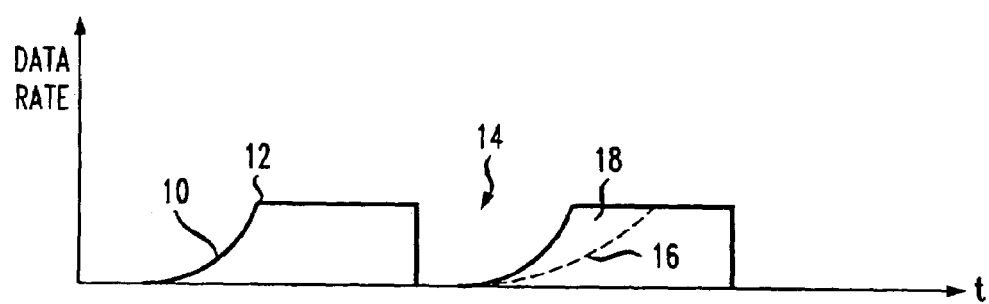
FIG. 1 illustrates data transfer rate vs. time for TCP data transmission.
Figure 2:
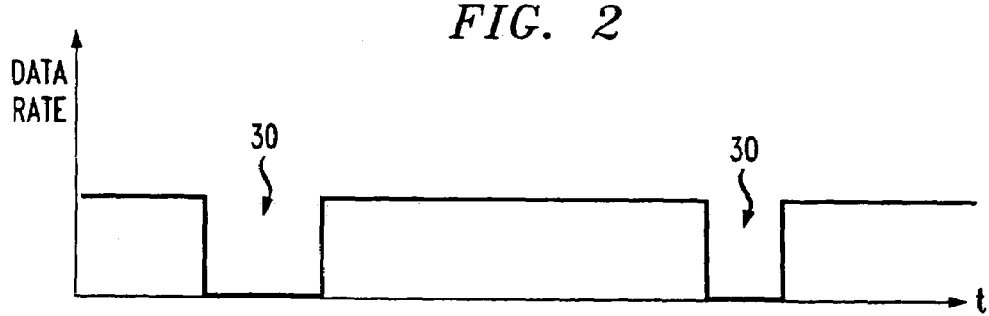
FIG. 2 illustrates an example of a wireless channel's bandwidth as a function of time.

FIG. 2 illustrates the bandwidth of a wireless transmission channel over time. It can be seen that dropouts 30 occur from time to time. These dropouts may be a result of fading, noise or sharing the wireless communication channel among several users. For example, each dropout period 30 may be the time during which another user is granted access to the wireless communication channel. In order to minimize the number of bandwidth wasteful ramp up periods, it is desirable to insert sufficient delays into the wireless communication channel so that that the TCP time out period is greater than most of the dropout periods 30.

Figure 3:
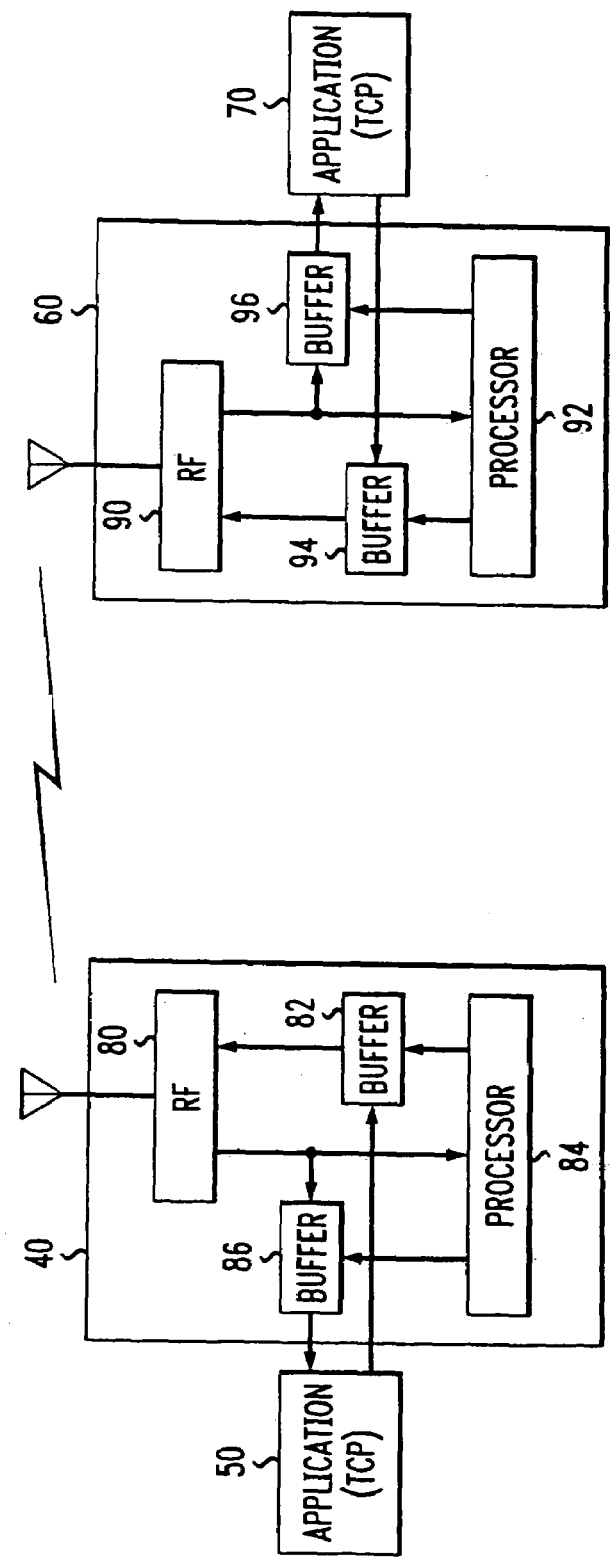
FIG. 3 illustrates a functional block diagram of a wireless communication channel.

FIG. 3 illustrates a functional block diagram of a wireless communication channel. Base station 40 receives data from a data source 50 hosting an application using TCP. Base station 40 communicates the data over an air interface to mobile station 60 which passes the received data to a data receiver 70 hosting an application using TCP. The delay can be inserted into the communication channel at either base station 40 or mobile station 60. In base station 40, data is transmitted and received via RF section 80. Channel delay can be inserted into data being transmitted by base station 40 or into acknowledges received by base station 40. Delays may be inserted data transmitted by base station 40 using buffer 82. Buffer 82 may be a shift register or cyclically addressed memory. Processor 84 controls the delay by controlling the number of stages the data must pass through when passing through buffer 82. Processor 84 monitors the channel delay by monitoring acknowledge messages received from RF section 80. As a result, processor 84 can modify the depth or amount of delay added by buffer 82 until the desirable delay is measured as seen by the delay in acknowledges received in response to data transmissions.

It is also possible to add delay by using buffer 86 to delay the acknowledge messages passed from base station 40 to application 50. Once again, buffer 86 may be a variable length or stage buffer such as a shift register or cyclically addressed memory. By adjusting the delay provided by buffer 86, processor 84 increases the channel delay as seen by application 50.

Whether the delay is provided using buffer 82 or buffer 86, application 50 is made to see longer delays which result in longer TCP time out periods.

In a similar fashion, mobile station 60 may also add delay to the transmission channel. Data is transmitted from and received through RF section 90 of mobile station 60. Processor 92 may control channel delay by controlling the depth of outgoing data buffer 94 or it may control the depth of acknowledge buffer 96. In either case, application 70 sees a greater channel delay which results in a longer TCP time out period. It should be noted that periods of other communication protocols may be controlled in a similar manner, and the approach outlined applies regardless of whether 50 transmits and 70 receives or 70 transmits and 50 receives.

Figure 4:
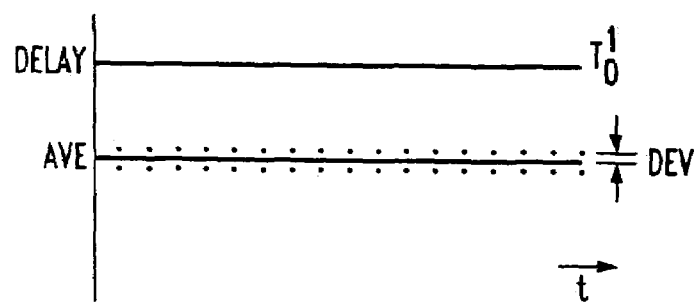
FIG. 4 illustrates variations in channel delays as a function of time.

FIG. 4 illustrates channel delay as a function of time. It can be seen that the channel delay is clustered around an average delay. Additionally, it should be noted that the deviation or the absolute value of the averaged distance between the different data transmission rates and the average transmission rates is rather small. Equation 1 illustrates that the time out ($T_0$) as defined by TCP is the sum of the average channel delay plus four times the deviation of the channel delays.

$$t_{ave} + 4\, t_{dev} = T_0 \qquad \text{EQ. 1}$$

Figure 5:
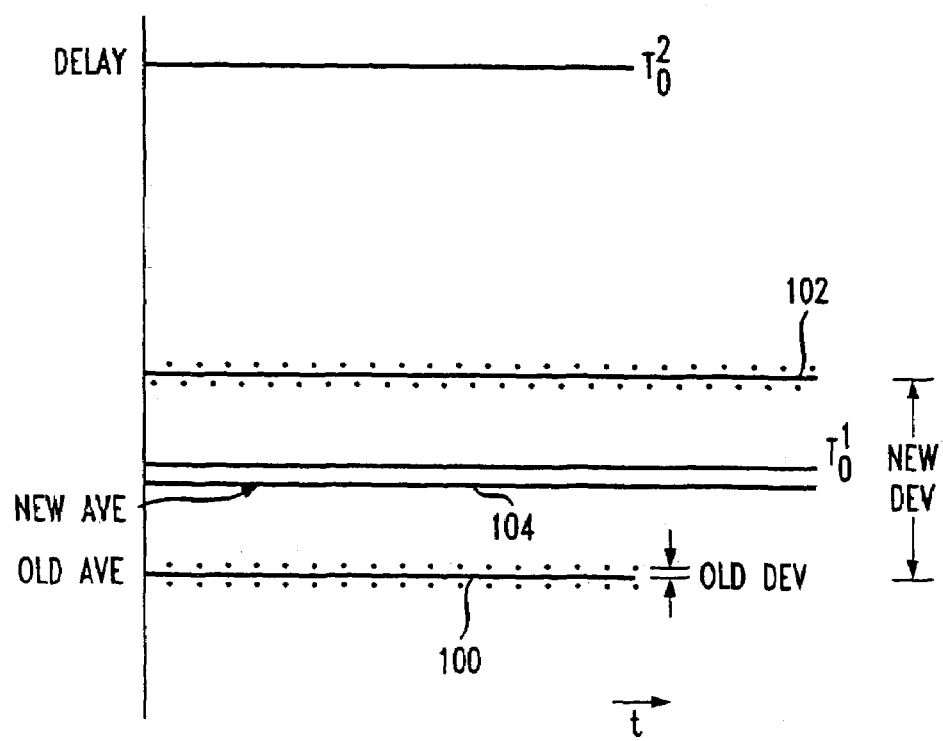
FIG. 5 illustrates a bimodal distribution of channel delay as a function of time.

FIG. 5 illustrates channel delays as a function of time where delay is added to the channel in order to control and thereby increase the length of the TCP time out. Assuming the same channel as the channel of FIG. 4, approximately 50 percent of the channel transmissions are not delayed which results in a cluster of channel delays along line 100, which is the average channel delay when no additional delays are added to the channel. Approximately, 50 percent of the transmissions are delayed to produce a second cluster of channel delays along line 102. This produces a larger deviation and results in an average channel delay illustrated by line 104. It should be noted that by delaying approximately 50 percent of the transmissions, a bimodal or substantially bimodal delay distribution is achieved. A bimodal distribution is desirable because is maximizes the deviation for a given increase in average delay time. Using Equation 1 it can be seen that the new time out associated with the delay pattern of FIG. 5, results in a time out ($T_0^2$) that is many times larger than the prior time out of $T_0^1$. As a result, by providing a relatively small increase in the average channel delay, the time out used by TCP is increased dramatically. It is desirable to add delays so that a time out length ($T_0$) is created that is larger than the typical dropout in the wireless communication channel bandwidth.

It should be noted that delay may be added at either the base station or mobile station and it may be added using one or both of the data transmission paths or the acknowledge receive path. It is also possible to control delay by scheduling multiple users to use the same communication channel. This can be accomplished by initially providing each user with a short amount of time using the communication channel. The initial short amount of time should be short enough that a time out does not occur while at the same time increasing the delay in the communication channel per user so that the time out used by the TCP protocol is increased.

The invention claimed is:

1. A method of time out control in a wireless communication system, comprising:
   inserting channel delay in data being carried over a communication channel to increase a length of time required for a time out and decrease a number of ramp up times,
   wherein said inserting includes inserting said channel delay into an acknowledge message to be transmitted over said communication channel in response to a received data transmission.

2. The method of claim 1, wherein said inserting includes inserting the channel delay into data to be transmitted by a base station over said communication channel.

3. The method of claim 2, further comprising:
   controlling an amount of said channel delay inserted in said data.

4. The method of claim 3, wherein said controlling includes:
   monitoring a plurality of acknowledge message received in response to said data transmitted with said channel delay, the plurality of acknowledge messages including said acknowledge message, and
   determining said channel delay for insertion based on a delay observed between transmission of said data and reception of the plurality of acknowledge messages.

5. The method of claim 1, further comprising:
   controlling an amount of said channel delay inserted in said acknowledge message.

6. The method of claim 5, wherein said controlling includes:
   adding said channel delay to said acknowledge message so as to increase an observed channel delay as observed by a receiver of the acknowledge message.

7. The method of claim 1, wherein said inserting includes adding said channel delay to said communication channel at a mobile station to control the time out for data transmission between said mobile station and an application.

8. A base station configured for controlling time out in a wireless communication system, comprising:
   means for transmitting and receiving data over a communication channel;
   means for inserting channel delay into data to be transmitted over said communication channel to increase a length of time required for a time out and decrease a number of ramp up times;
   at least one buffer adapted for adding channel delay in said data to be transmitted; and
   a processor monitoring acknowledge messages received in response to said data transmitted with said channel delay, and determining a desired channel delay based on the received acknowledge messages.

9. The base station of claim 8, wherein said processor modifies the depth or amount of the channel delay added by the buffer until a desired delay is measured as seen by a delay in receiving said acknowledge messages.

10. The base station of claim 8, wherein said buffer is one of a shift register and a cyclically addressed memory.

11. A mobile communication device configured for controlling time out in a wireless communication system, comprising:

means for transmitting and receiving data over a communication channel;

means for inserting channel delay in said communication channel to control time out for data transmission and decrease a number of ramp up times between said mobile communication device and an application;

at least one buffer adapted for adding channel delay in data to be transmitted by the device; and a processor controlling a depth of said at least one buffer to control said channel delay.

12. The device of claim 11, wherein said at least one buffer is one of an outgoing buffer and an acknowledge buffer.

\* \* \* \* \*